June 4, 1957  J. R. OISHEI  2,794,203
WINDSHIELD WIPER
Filed July 13, 1951
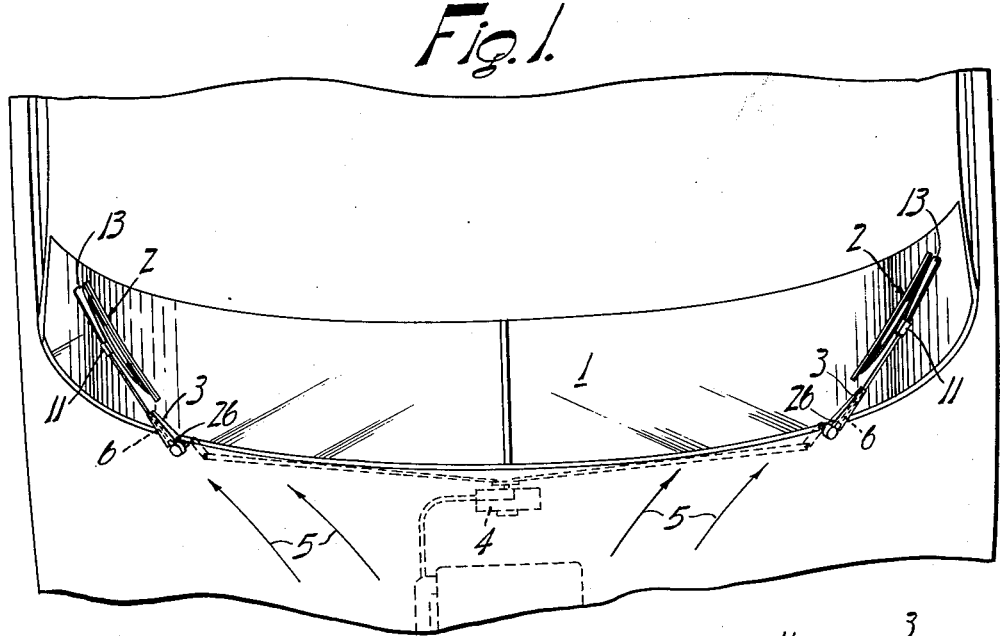
Fig. 1.
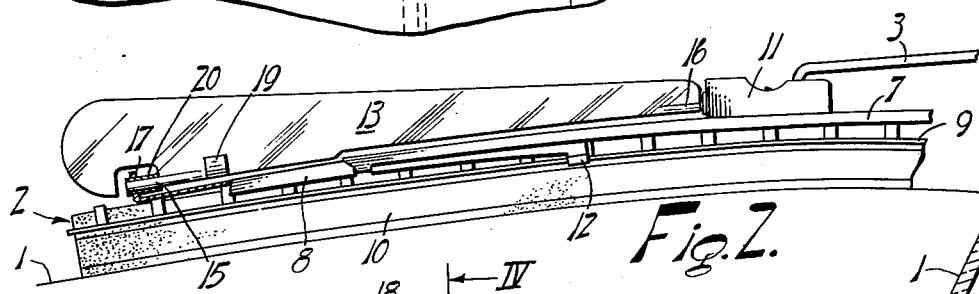
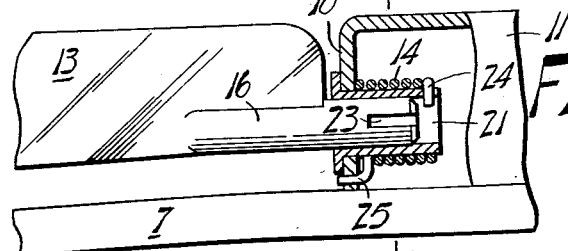
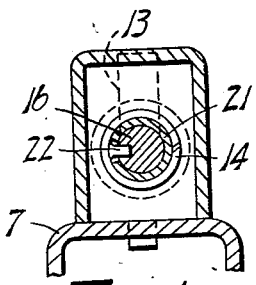
INVENTOR.
John R. Oishei
BY
Bean, Brooks, Buckley & Bean
ATTORNEYS

United States Patent Office 2,794,203
Patented June 4, 1957

2,794,203

WINDSHIELD WIPER

John R. Oishei, Buffalo, N. Y., assignor to Trico Products Corporation, Buffalo, N. Y.

Application July 13, 1951, Serial No. 236,583

12 Claims. (Cl. 15—245)

This invention relates to the windshield cleaning art and especially to the wiping blade which is oscillated over the windshield for maintaining a clear field of vision therethrough.

With the modern automobile fast speeds are readily attained and, in the open country, are maintained under normal present day driving conditions, with a consequential development of wind currents of high velocity over the front end of the vehicle, the head-on winds dividing and flowing off toward the opposite sides of the windshield as well as upwardly over the stream-lined contour of the vehicle body. When the windshield cleaner is in operation, such high velocity wind currents will frequently lift the wiping blade off the windshield and thereby cause it to fail in its function. The lifting action of the wind currents is more pronounced on the curved windshield and is greatly accentuated when driving into a heavy wind.

To increase the spring urge of the wiper actuating arm, in an effort to counteract this hazard, would subject the wiping blade to an abnormal wiping pressure and place an added load upon the light windshield cleaner motor over the normal load requirements, with no assurance even then that the wiper would not fail under extreme testing. Efforts have been made to avoid this unfavorable situation by making the wiping blade smaller to reduce the extent of its surface area that is exposed to the wind currents, but such efforts have not been productive of a wiper which would remain in wiping contact with the windshield glass under extreme conditions and still be practical for normal use.

The primary object of this invention is to provide a wiper which will remain operative under severe unfavorable conditions and without increasing the burden for the cleaner motor.

A further and equally important object of the invention is to provide a wiper that will put to advantage the heretofore unfavorable wind currents in maintaining the desired wiping contact under all conditions of modern travel.

Again, the invention has for its object to provide a wiper that is of practical design and one which will effectively provide and maintain a clear field of vision for safe driving.

The foregoing and other objects will manifest themselves as this description progresses, reference being made therein to the accompanying drawing wherein Fig. 1 is a fragmentary view of a motor vehicle depicting in plan the windshield cleaner installation thereon;

Fig. 2 is a similar view, mostly in side elevation and showing the improved wiper with its pressure fin;

Fig. 3 is a view partly in section and illustrating the manner of pivoting the fin at its inner end in the housing of the arm attaching coupler;

Fig. 4 is a transverse section about on line IV—IV of Fig. 3;

Fig. 5 is a view showing the wiper in end elevation and its mode of operation;

Fig. 6 is a view illustrating the wiper in its parked position; and

Fig. 7 is a fragmentary end view partly broken away and showing a modified embodiment in which the wind vane is fixed at a given optimum angle.

Referring more particularly to the drawing, the numeral 1 designates the curved windshield of a motor vehicle over which oscillates a pair of wipers 2 carried by arms 3 and driven by a motor 4. When traveling, the head-on wind or airstream will divide and move off to the sides of the vehicle, as indicated by the arrows 5, in addition to slipping up over the top. The full impact of these cross air currents 5 will impinge against the inwardly moving wipers with a lifting force sufficient to lift the wiping blade off the windshield against the tension of the usual arm spring 6. This lifting action is more pronounced on the curved windshield because of the rearwardly curved outer contours up which the wiping blades move on their inward strokes. Further, each wiper has a greater surface area exposed to the wind by reason of its surface-conforming superstructure that comprises a primary yoke 7, terminal secondary yokes 8 and a flexible backing 9 for supporting the rubber squeegee element 10. The yokes are of channel-shape in cross section, with the primary yoke having the arm attaching coupler 11 fixed thereon while the secondary yokes have their ends 12 freely grasping the flexible backing to permit it to flex.

According to the present invention, each wiper is provided with a wind reacting surface upon which the respective laterally flowing wind currents will impinge to urge the wiper downwardly toward the windshield for holding it more firmly in its operative contact with the windshield. Obviously then, the reacting surface area will be of sufficient expanse to counteract the objectionable lifting force with the surface area on the passenger side being oppositely inclined to the driver side of the vehicle. In the present disclosure, the reacting surface is carried by a fin or vane 13, preferably on the back of the wiper and at the outer end portion thereof. The wind fin may be flared in an outward direction to increase the surface area toward the outer end for a greater effectiveness. It may be fixed at the optimum angle to cause the force of the wind currents to react most favorably in maintaining the wiping contact, or it may be movably mounted to yieldably resist the air currents in producing an uniform downward urge. When so responding to the wind, its yieldability may be determined by a backing spring 14 that restores the wind fin to its normal, inoperative position but permits it to move to an effective location in accordance with the wind pressure, such as wind currents above fifty miles per hour, for example. In addition to so holding the fin at the proper angle for a given wind, it also serves to prevent it from idly flopping back and forth under moderately slow rates of travel.

In the illustrated embodiment of Figs. 1 through 6, the wind fins are each pivoted to the back of each wiper for hinging about an axis lengthwise thereof, the fin having trunnion 15 and 16 journaled in alined bearings one of which may be formed in an ear 17 that is turned up from the remote end of the outer secondary yoke and the other provided in the end wall 18 of the coupler 11. The spring 14 is coiled about the trunnion 16 and so attached as to restore the wind fin to its normal position of rest, as depicted in Fig. 6 where it will be concealed behind the wiper and thereby avoid restricting the field of vision. This will dispose the wind fin normally at a downward angle when the blade is parked close to the cowl at the base of the windshield. This normal position can be determined by a fin-carried stop lug 19 abutting the underlying yoke 8. If desired, the trunnion 15 and 16 may be encased in metal thimbles 20 and 21 that are suitably secured, as by a pressed fit or through a spline 22 playing in a groove 23. Where a thimble is employed, the coiled spring 14 may have one end 24 interlocked therewith and the opposite end anchored at 25 in the end wall 18. The longitudinal inner margin of the wind fin may be shaped to fit close to the surface-conforming yoke structure without precluding its functioning. Since the fins react to the oppositely flowing cross currents, the coiled springs will act one in a clockwise direction and the other in a counter-clockwise direction.

In the modified embodiment of Fig. 7, the wind vane 13' is shown fixed to the secondary yoke 8', as at 15', in a manner to permit the pressure distributing superstructure to function in conforming the wiper to the contour of the surface being wiped. As stated above the vane 13' may be fixed at the optimum angle to accomplish the desired purpose.

In use, the wipers will move inwardly from the positions of Fig. 1 and in so doing will encounter the strong wind currents as they divide and flow crosswise of the vehicle. An airstream having a predetermined velocity will cause the wind fin to respond and move to the full line position of Fig. 5, while a stronger wind pressure will cause it to yield to the broken line position wherein the fin may overhang the wiper and extend into the field of vision. Therefore, the wind-pressure applying fin may be made transparent by forming it of a suitable plastic, such as polystyrene.

The wind fin is journaled by its trunnion on the holder 7, 8, 9, for limited play which enables the yokes to move relative to each other in their surface conforming action.

When the wind fins are operatively disposed a wind pressure of the determined degree will strike them a glancing blow and in slipping thereover will produce a component force that is substantially normal to the windshield for serving the intended purpose of maintaining the wiping engagement 5. When the wind pressure falls below the predetermined, the wind fin will return to its concealed position. The wipers are parked at the lower edge of the windshield where an air pocket is formed beneath the airstream that passes up over the windshield. Therefore the wind fin is protected from the airstream. Under certain conditions, it may be desirable to expand the surface area of the wind fin lengthwise of the wiper instead of transversely thereof. The additional surface area is extended beyond the normal margins of the wiper to secure, in effect, a lever advantage at the outer end of the wiper remote from the usual arm hinge 26. The wind reaction surface of the wind fin is so placed that it developes a pressure normal to the windshield surface out of the air currents which in themselves have a tendency to reduce the net pressure in the wiping contact. The amount of the holding pressure to keep the wiper functioning is somewhat in proportion to the amount of the disturbing factor that tends to lift the blade off the shield. The force of the reaction supplements the spring pressure of the actuating arm. The reaction pressure from the oblique fin surface is approximately equivalent to the lifting force of the air as it impinges upon the other parts of the blade. They keep in balance and result in a fairly uniform net pressure of wiping contact. With a predetermined decrease in the wind velocity the wind fin will fold itself away without imposing any substantial burden upon the light windshield cleaner motor.

The foregoing description has been given in detail for clarity and ease of understanding and without thought of limitation since the inventive concept is capable of assuming other physical embodiments without departing from the spirit of the invention and the scope of the appended claims.

What is claimed is:

1. A windshield wiper comprising an elongate flexible squeegee body having a wiping edge along one margin, a flexible backing for the body, a primary yoke having arm attachment means and means for supporting the squeegee body, said supporting means including a secondary yoke rockably mounted on one end of the primary yoke and supporting the flexible backing therefrom, and a wind fin pivotally supported at one end on the secondary yoke and at the opposite end on the primary yoke with sufficient play to permit the secondary yoke to rock.

2. A windshield wiper comprising a wiping blade, and a wind pressure applying member having a wind deflecting surface normally sloped relative to the surface being wiped and yieldably mounted with respect to the blade for movement in response to wind currents to shift the surface to variably effective positions in accordance with the strength of the wind currents.

3. A windshield wiper comprising a wiping blade, a wind pressure applying member having a wind deflecting surface normally inclined to the windshield surface and mounted for movement in response to wind currents to shift the wind deflecting surface to variably effective inclined positions relative to said windshield surface in accordance with the strength of the wind currents, and resilient means acting on said member against the wind currents for yieldably resisting the movement of the pressure member to maintain a substantially uniform pressure in the wiping contact of the blade against the windshield.

4. A windshield wiper comprising a flexible wiping blade, a holder including two relatively movable pressure distributing yokes, each yoke having journal bearings, a wind pressure-applying fin having journal support in the bearings for swinging laterally of the blade under wind pressure and having a wind reacting surface effective to urge the blade into wiping contact, and resilient means yieldably restraining the wind responsive movement of the fin to vary the disposition of the reacting surface in accordance with the wind pressure.

5. A windshield wiper comprising a flexible wiping blade, a holder including two pivotally connected pressure distributing yokes, each yoke having journal bearings, a wind pressure-applying fin having journal support in the bearings for swinging laterally of the blade under wind pressure, and resilient means yieldably restraining the wind responsive movement of the fin, said fin being transparent.

6. A windshield wiper comprising a squeegee body, a holder therefor having relatively movable parts imparting a surface conforming flexure to the squeegee body, a wind pressure-applying fin arranged lengthwise of the latter and extending outwardly therefrom and away from the windshield, said fin having pivotal support on the movable parts for wind responsive movement about a longitudinal axis, stop means determining a normal position of rest for the fin, and resilient means yieldably holding the fin in its rest position and yielding for such wind responsive movement.

7. A windshield wiper comprising an elongate flexible squeegee body having a wiping edge along one margin, a flexible backing for the body, a primary yoke having arm attachment means, a secondary yoke rockably mounted on one end of the primary yoke and supporting the flexible backing therefrom, and an elongated wind fin pivotally supported at one end on the secondary yoke and at the opposite end on the primary yoke with sufficient play to permit the secondary yoke to rock, said wind fin being arranged with a planar wind deflecting surface which when in operation is sloped relative to an associated windshield surface to provide a component of wind force normal to said windshield surface.

8. A windshield wiper comprising a flexible wiping blade, a holder including two relatively movable pressure distributing yokes, each yoke having journal bearings, a wind pressure-applying fin arranged with a planar wind reacting surface normally obliquely-angled relative to the windshield surface to provide a component of force normal thereto and having journal support in the bearings for swinging laterally of the blade under wind pressure to effectively urge the blade into wiping contact, and resilient means yieldably restraining the wind responsive movement of the fin to vary the disposition of the reacting surface in accordance with the wind pressure.

9. A windshield wiper comprising a flexible wiping blade, a holder including two pivotally connected pressure distributing yokes, each yoke having journal bearings, a wind pressure-applying fin provided with planar wind reacting surfaces and having journal support in the bearings for swinging said wind reacting surfaces laterally of the blade and obliquely relative to the windshield surface under wind pressure, and resilient means yieldably restraining the wind responsive movement of the fin.

10. For use on a curved windshield on which wind currents produced by the forward movement of the vehicle divide laterally and move outwardly over the opposite side margins of the windshield, a wiper and arm assembly comprising a wiper with an elongated flexible wiping body having a wiping edge extending lengthwise thereof and an elongated backing strip of greater width than thickness supporting said body for flexing the wiping edge into wiping contact with a curved surface of such a windshield, and a pressure distributing carrier comprising primary and secondary members connected for relative movement and arranged to apply pressure to the wiper at longitudinally spaced points, a spring pressed oscillatable actuating arm operable to move the wiper on one stroke inwardly from the adjacent side margin of a windshield surface and in opposition to such laterally moving wind currents and to move the wiper on an outward stroke in the direction of such wind currents, said arm having a resiliently yieldable hinged outer section connected to the primary member and operable to provide the required pressure in the wiping contact of the lip on the surface being wiped, and a pressure amplifying means on the wiper and arm assembly having a wind receiving surface reactive to the outwardly moving wind currents to impose a force component in amplification of the arm applied pressure to maintain the wiping contact.

11. A wiper for use with a windshield having diverging lateral end portions, said wiper including an elongate flexible squeegee body having a wiping edge along one margin, a flexible backing for said body, a flexible holder for said wiper operable under pressure of an actuating arm to conform the blade to the surface of such a windshield, and a normally inoperative wind pressure member resiliently mounted on the holder for yielding in the pressure of wind currents and having a wind engaging surface arranged to be sloped relative to an associated windshield surface by such currents to develop a component force downward onto such associated windshield surface substantially normal thereto.

12. A wiper for use with a windshield having diverging lateral end portions, said wiper including an elongate flexible squeegee body having a wiping edge along one margin, a flexible backing for said body, a flexible holder for said wiper operable under pressure of an actuating arm to conform the blade to the surface of such a windshield, and a normally inoperative wind pressure member resiliently mounted on the holder for yielding in the pressure of wind currents and having a wind engaging surface arranged to be sloped relative to an associated windshield surface by such currents to develop a component force downward onto such associated windshield surface substantially normal thereto, said wind pressure member having its pressure area increased outwardly toward the free end of said wiper.

References Cited in the file of this patent

UNITED STATES PATENTS

| | | |
|---|---|---|
| 1,684,907 | Blake | Sept. 18, 1928 |
| 2,580,577 | Nally | Jan. 1, 1952 |

FOREIGN PATENTS

| | | |
|---|---|---|
| 659,853 | France | Feb. 11, 1929 |
| 543,635 | Great Britain | Mar. 5, 1942 |
| 957,805 | France | Aug. 29, 1949 |